United States Patent
Schneider

Patent Number: 5,441,142
Date of Patent: Aug. 15, 1995

[54] APPARATUS FOR DIVIDING A SINGLE FILE STREAM OF CONVEYED CONTAINERS INTO A PLURALITY OF SEPARATE STREAMS

[75] Inventor: Egon Schneider, Neutraubling, Germany

[73] Assignee: Krones AG Hermann Kronseder Maschinenfabrik, Neutraubling, Germany

[21] Appl. No.: 114,805

[22] Filed: Aug. 31, 1993

[30] Foreign Application Priority Data

Sep. 2, 1992 [DE] Germany ............ 9211817 U

[51] Int. Cl.$^6$ ............................. B65G 47/26
[52] U.S. Cl. ....................... 198/492; 198/456
[58] Field of Search ............ 198/436, 442, 456; 221/68

[56] References Cited

U.S. PATENT DOCUMENTS

| | | | |
|---|---|---|---|
| 2,308,154 | 1/1943 | Carter | 198/22 |
| 2,451,104 | 10/1948 | Lowe | 198/30 |
| 2,670,835 | 3/1954 | Huttmann | 198/442 |
| 2,684,800 | 7/1954 | Lewis | 226/14 |
| 4,277,061 | 7/1981 | Nagel et al. | 198/442 |
| 4,723,649 | 2/1988 | Hunter et al. | 198/442 |
| 4,880,103 | 11/1989 | Ludwig et al. | 198/442 |

FOREIGN PATENT DOCUMENTS

| | | | |
|---|---|---|---|
| 0263047 | 4/1988 | European Pat. Off. | |
| 1387920 | 12/1964 | France | |
| 1103250 | 1/1959 | Germany | 198/442 |
| 2227912 | 12/1973 | Germany | |
| 3638436 | 5/1988 | Germany | |

*Primary Examiner*—Kenneth Noland
*Attorney, Agent, or Firm*—Ryan, Kees & Hohenfeldt

[57] ABSTRACT

Containers such as bottles are conveyed on a conveyor belt in single file between parallel infeed guide rails above its laterally opposite edges to a transition region where the parallel guide rails become confluent with smoothly S-shaped transition side rails that diverge but ultimately become parallel in a container discharge region with the conveyor belt running centrally between them. A flexible and swingable diverter blade has one end fastened down stream of the transition region and has a slider on its other freely movable end. The slider is guided on a rod that extends across and above in the belt in the upstream transition region. A controlled actuator moves the slider back and forth across the belt to swing the diverter blade in one direction for the blade to form a passageway in conjunction with one of the S-shaped side rails and then swings back to form a passageway in conjunction with the other so as to alternately divert container bottles to opposite sides of the longitudinal center line of the belt. The containers encounter a separator guide rail after they pass the diverter blade which rail is arranged over the center line of the belt for cooperating with alternate S-shaped side rails to keep the containers on the belt. Broken bottles become too short for their necks or bodies to be guided so they can fall from the belt.

21 Claims, 3 Drawing Sheets

APPARATUS FOR DIVIDING A SINGLE FILE STREAM OF CONVEYED CONTAINERS INTO A PLURALITY OF SEPARATE STREAMS

BACKGROUND OF THE INVENTION

The invention disclosed herein pertains to apparatus for dividing a single file stream of containers being transported on a conveyor belt into a plurality of separate streams.

Apparatus for dividing a stream of conveyors into multiple streams are basically known and are illustrated in U.S. Pat. Nos. 2,684,800 and 2,308,154, for example. The separation process is used in container filling and packaging lines, for example, to supply containers to packaging machines that have a plurality of infeed lanes. For example, in bottle or can filling lines a labelling machine which requires a single file container infeed stream is followed by a packaging machine which requires a multiple file stream to package bottles in crates or cartons.

Existing apparatus for dividing a single file line of containers into multiple lines employs a rigid swinging arm which impacts the containers to divert some containers sideways into one line and other containers sideways into an opposite parallel line. One disadvantage of swinging a rigid arm into the sides of the containers to divert them is that a high level of noise is developed and, furthermore, the impact of the arm defaces or blemishes the surface of the containers, especially bottles.

SUMMARY OF THE INVENTION

Accordingly, an objective of the invention disclosed herein is to divide a single line of the containers into multiple lines in such a way that even when performing at high speed, the separation process occurs in a quiet, low noise and container protective way.

According to the invention, there is an infeed of containers advancing in single file stream on a conveyor belt. There are guides on each side of the conveyor belt in the infeed region. At a transition region where transferring of an incoming container into one outgoing stream or another occurs, the infeed containers encounter the free end of a flexible longitudinally or downstream extending diverter rail whose free end can be advanced and retracted across the conveyor belt and whose opposite end is anchored downstream. At the region where division of containers into separate streams is initiated, the side rails on the infeed part of the conveyor become confluent with two opposite smoothly diverging transitional guide rails. The downstream fastened end of the flexible diverter rail is centrally located over the longitudinal center line of the conveyor belt so that when the diverter rail is swung to one side, it forms in conjunction with one of the transitional guide rails a passageway leading to one side of the conveyor belt. When the diverter rail swings to the other side, it defines in conjunction with the other transitional rail a passageway for leading to the opposite side of the top surface of the conveyor belt. Thus, the containers in each stream overhang the side edges of the conveyor belt as they advance on the belt in their separate lanes. There is a fixed separator rail running along and above the longitudinal center line of the belt to keep the containers in the side-by-side lanes separated. An actuator such as a pneumatic cylinder is used to advance and retract or oscillate the free end of the diverter rail laterally across the width of the conveyor belt to cause the containers to be smoothly guided into one lane or the other.

Because of the flexibility of the movable diverter rail, it has a smooth contour and is without sharp edges so that containers are not impacted in any way that they could be damaged, even at high operational speeds. The transitional guide rails that are confluent with the infeed guide rails on the infeed portion of the conveyor where the containers are in single file, have the containers diverted against them so the containers make tangential sliding, but not impact, contact with the surfaces. This contributes toward reducing noise and substantially eliminating container blemishing as well. A precise transition from the surface of the transitional guide rails to the surface of the movable diverter rail is achieved by having the free end of the diverter rail swing into a recess in the rails. The depth of the recesses corresponds to the thickness of the free end of the divert rail. The free end of the diverter rail registers in these recesses so as to be coplanar and fit smoothly to the inside surface of the infeed guide rails. In other words, there is no projection of any kind which the moving containers might encounter but, to the contrary, the guide rail surfaces and the surfaces of the diverging opposed transitional rails are smooth along their lengths. It is herein desirable and advantageous to have the transitional guide rails connect with the downstream container discharge rails when the transitional guide rails in their diverging region are made flexible over their entire length, thus, a tangential smooth transition is achieved where guide rails junction.

The diverter rail is preferably flexible at its free end although it is even more advantageous to have a diverter rail which is flexible over its entire length so as to be more smoothly confluent with the rails of the infeed region of the conveyor.

How the foregoing objectives and features are implemented will appear in the ensuing more-detailed description of a preferred embodiment of the invention which will now be set forth in reference to the drawings.

DESCRIPTION OF A PREFERRED EMBODIMENT

Figure 1:
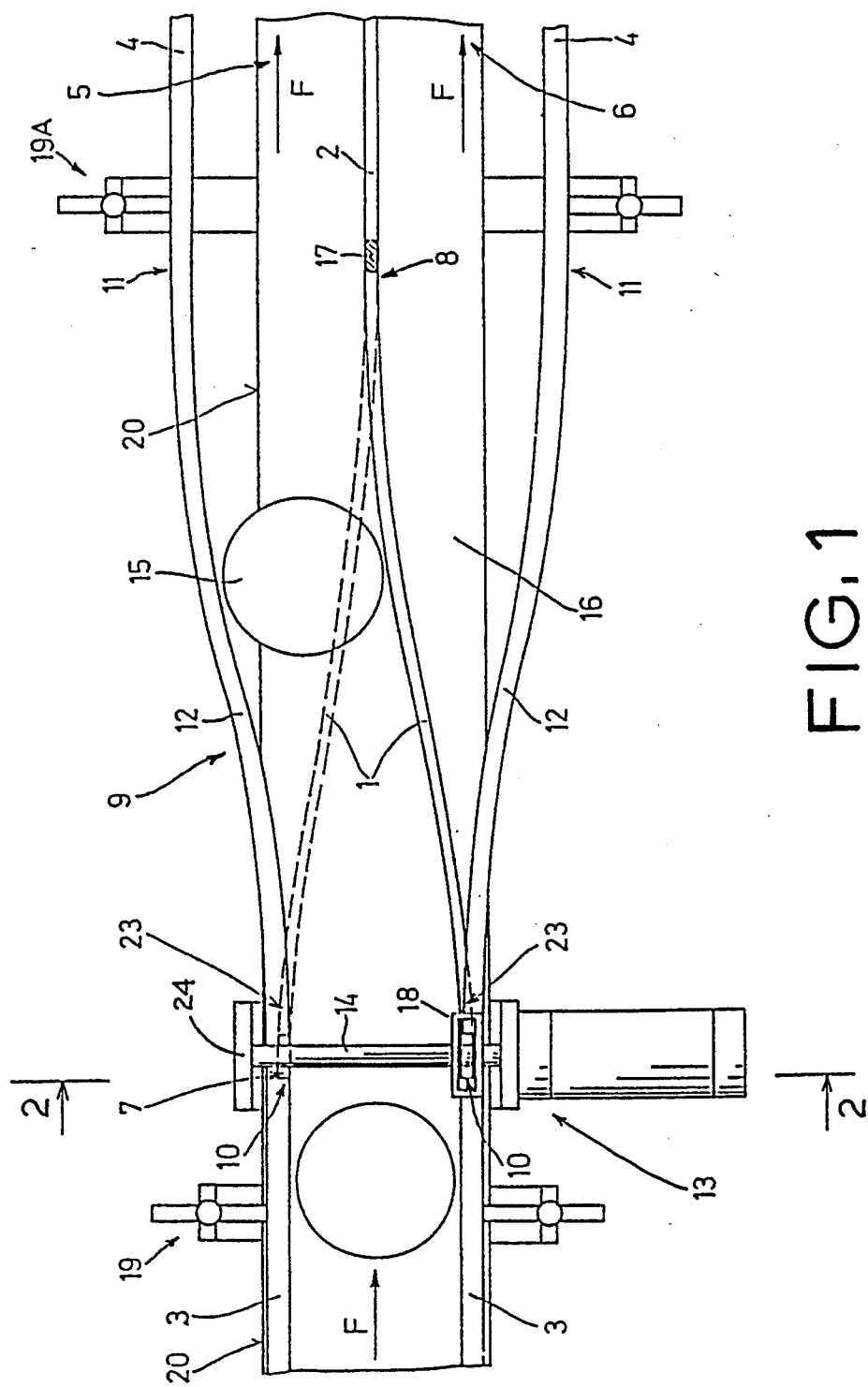
FIG. 1 is a diagrammatic plan view of the conveyor and diverter rail used in accordance with the invention.
Figure 2:
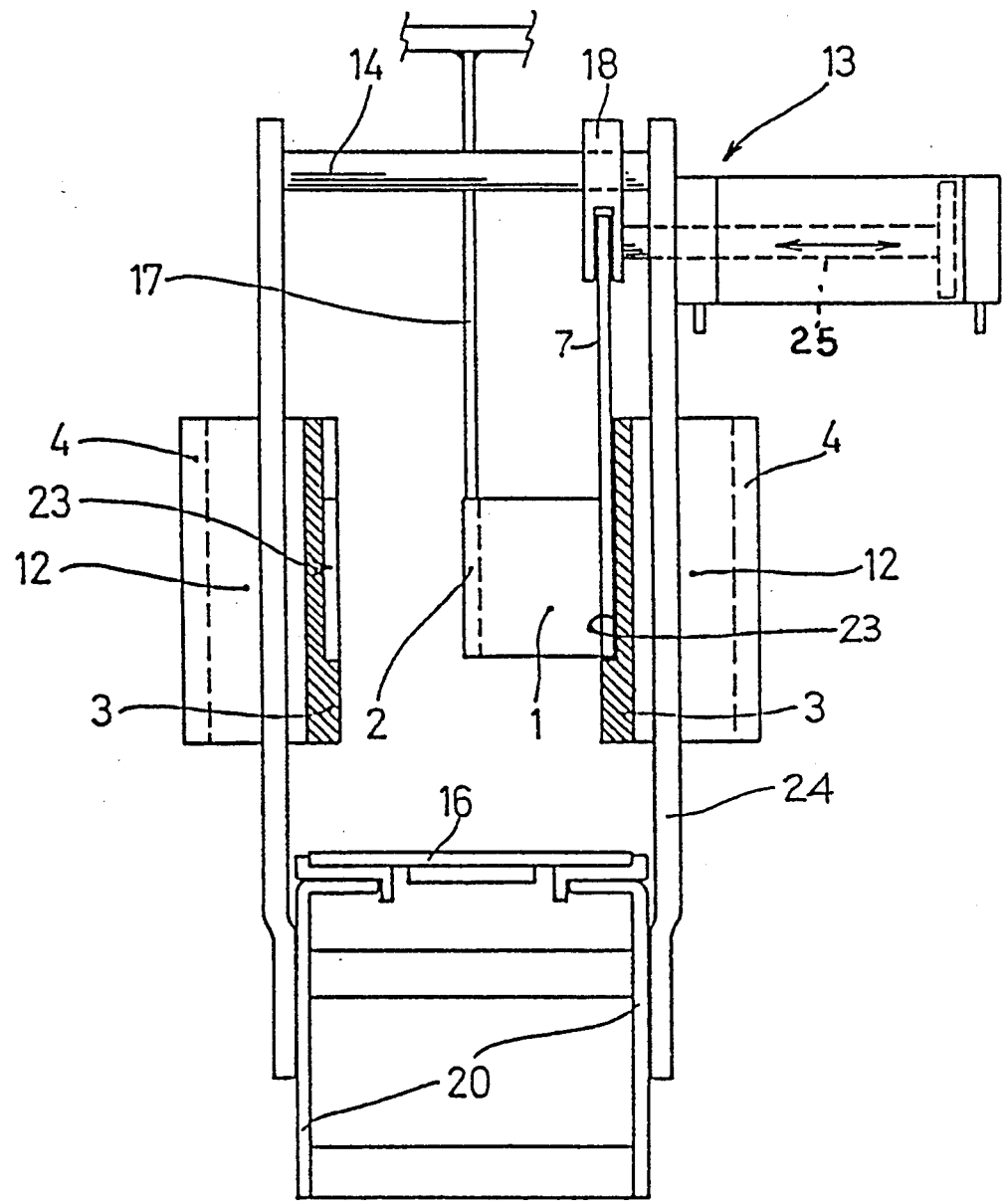
FIG. 2 is a vertical sectional view taken along a line corresponding with 2—2 in FIG. 1.

Referring to FIG. 1, the containers 15 are transported downstream in upright position on a conveyor belt 16 in the direction of the arrows F. Only one conveyor belt is used in the preferred embodiment. The containers are divided into two separate streams which are carried on the one conveyor belt. At the far left portion of FIG. 1, the containers are being transported and reach this region of conveyor belt 16 in single file condition. The region is called a transition region herein. In the infeed region of the apparatus, there are laterally separated container infeed guide rails 3,3 which are above the plane of the conveyor belt 16. The guide rails 3,3 are supported on a structure 19 which facilitates adjusting the distance between them to provide for accommodating different container sizes. Starting in the transition region which lies underneath the guide rod 14, the ends of S-shaped transitional guide rails make a smooth junction with the infeed transition region guide rails 3,3. The laterally spaced apart transitional guide rails 12 diverge perceptively and continue to diverge until they arrive at about the place where the reference numerals 11 are applied. After this place, the transitional guide rails constitute opposite discharge rails 4 which are parallel to each other. As can be seen in FIG. 2, the discharge guide rails 4 and transitional rails 12 are all one piece and are all elevated above the horizontal plane of conveyor belt 16. The conveyor belt 16 runs centrally between opposite discharge guide rails 4. In fact, the contoured guide rails 12 and the guide rails 3 are symmetrical to the center of the conveyor belt 16. Where the outfeed rails 4 begin, a separator rail 2 is positioned above the conveyor belt 16 to keep the containers being transported on the belt separated from each other as shown in FIG. 2.

A container diverter rail 1 is shown in one position in FIG. 1 in solid lines and in its alternate position in dashed lines. Diverter rail 1 is preferably composed of metal and is flexible, somewhat like a leaf spring. One downstream end 8 of the flexible diverter rail is anchored to a support member marked 17. As shown in FIG. 2, the upper end of support member 17 is anchored. The transitional rails 9, 12, 11, 4 are supported on a structure 19A which facilitates adjusting the distance between rails to accommodate different size containers.

An actuator 13, which may be an electromagnetic actuator or a pneumatic cylinder, for example, is mounted to one of the bracket members 24. The pneumatic actuator 13 used in the illustrated embodiment has a piston rod 25 which is connected to slider 18. The slider is slidable on a guiderod 14 for the purpose of deflecting diverter rail 1 between its solid line position and its dashed line position. One may see in FIGS. 1 and 2 that a flat bar member 7 extends downwardly from slider 18 and connects to the free end of diverter rail 1. Note also that the lower end of the bar 7 nests in a recess 23 that is formed at the junction of infeed guide rails 3,3 and diverging guide rails 12,12. The recess 23 can be faced with resilient material for noise reduction. It is easier to observe in FIG. 1 where, at the end of the diverter rail 1 represented by dashed lines, the vertical bar 7 has its inside face flush with the inside face of the rails 3 and 12. Thus, the diverter rail 1 presents no sharp edge to the containers that pass across the transition line that extends transversely of conveyor belt 16 and lies under the guiderod 14. In FIG. 2, it is the solid line representation of the diverter rail that shows the bar member 7 nested in infeed rail 3 where that rail would junction with diverging transitional rail 12. There can be a leaf spring, not shown, on the side of flexible diverter rail 1.

In FIG. 1, the actuator 13 has been activated to a condition where it has drawn the free end of diverter rail 1 to the position in which it is shown in solid lines. Under this condition, diverter rail 1 forms a passageway of uniform size for the container 15 in conjunction with laterally spaced apart S-shaped transitional guide rail 12. A part of container 15 is hanging over the edge 20 of conveyor belt 16. As the conveyor belt 16 carries the container 15 further between guide rail discharge portion 4 and center separator rail 2, at least about fifty percent (50%) of the diameter of the illustrated container 15 will overhang the edge 20 of the conveyor belt.

In operation, there is a controller, not shown, for actuator 13. The controller controls the actuator to hold the slider 18, and hence, the diverter rail 1 in swung or unswung positions for a pre-determined length of time or until a certain number of containers are counted for going into one of the passageways between the diverter rail and side rail 12. The actuator can then be controlled to move in the opposite direction to cause the flexible diverter to establish a passageway between the diverter rail 1 and the other S-shaped transitional side rail 12 for a pre-determined time or until a count of a pre-determined number of containers are diverted down that passageway. It should be noted that the parallel opposite discharge rails 4 are mounted at a distance above the conveyor belt 16 and are spaced laterally of the edges of the conveyor belt. This creates an opening between rail 4 and belt 16 such that any bottle that has its body or neck broken off finds itself without any lateral support by reason of it passing below discharge rail 4 so that bottles that have these defects can fall off of the conveyor belt to be collected in suitable chambers, not shown. The defective bottles, of course, are inclined to tip off of the conveyor belt because they are overhanging the edges of the conveyor belt by a substantial amount by the time they reach the discharge rail portions 4.

Figure 3:
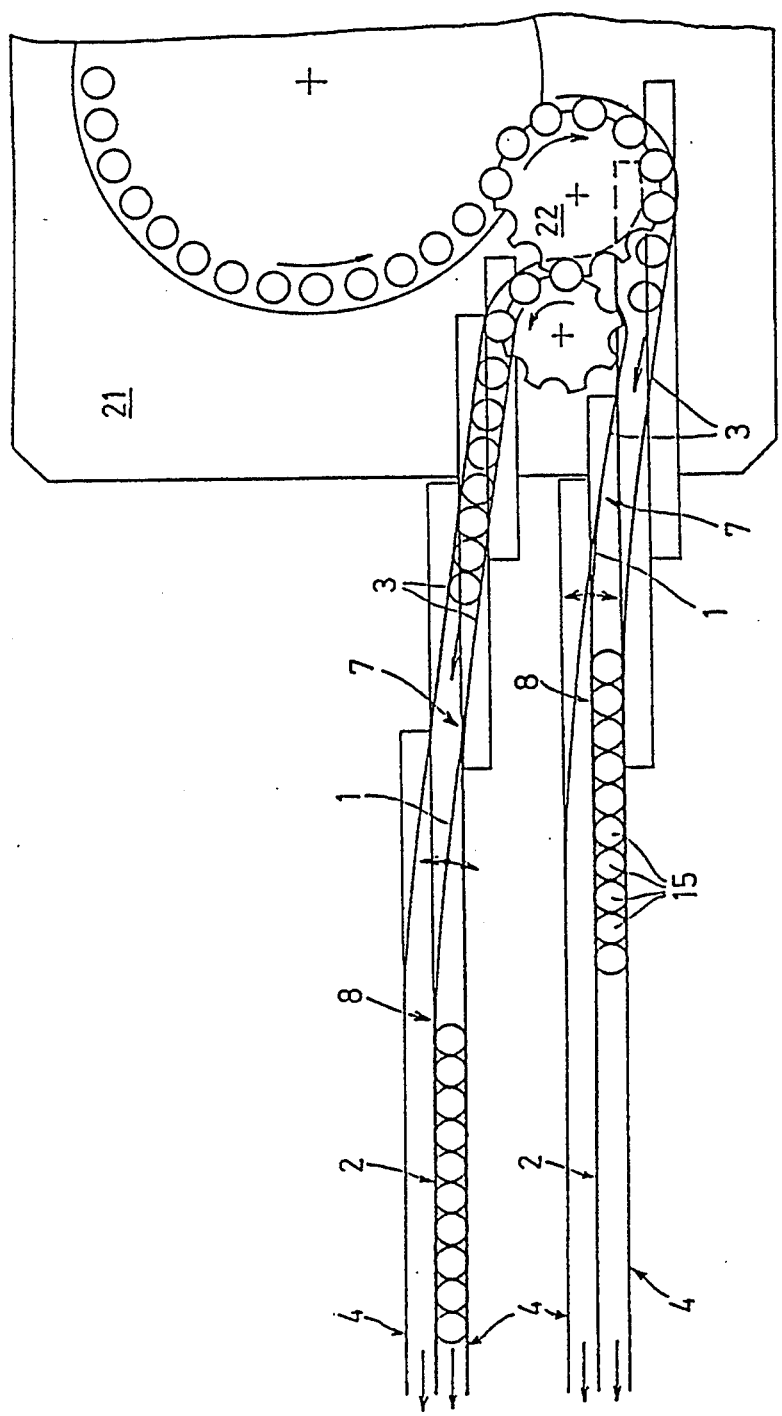
FIG. 3 is a top plan view of an alternative embodiment of the inventive concept.

FIG. 3 illustrates an alternative embodiment of the invention wherein there are two swingable deflectors 1 arranged in parallel with each other. Containers that leave the container handling machine 21 enter the pockets of a discharge starwheel 22. This starwheel is equipped with controllable holding and releasing devices, not shown, such as clamps, hasps or vacuum devices, alternatively to using one of the movable diverter rails which are mounted parallel to each other. For example, it is possible to guide container groups alternatively to both movable diverter rails 1 as a consequence of which on both single file conveyor tracks, leading to the movable diverter rails 1, single file container groups originate, consisting, for example, of ten or more containers having gaps of equal length between them. These gaps can be utilized to switch the movable diverter rails 1, as soon as the last container of a group has reached the downstream position of a diverter rail 1, that is, has reached the position between the separator rail 2 and a discharge rail 4.

I claim:
1. Apparatus for dividing a single file stream of containers into a plurality of separate streams comprising:
a horizontally translating conveyor for conveying the single file stream of containers upright in a downstream direction to a transition region, said conveyor having a portion extending downstream through and beyond said transition region,
an elongated container diverter rail having at least a section that is flexible, the diverter rail having opposite ends, one end being fixed downstream of the transition region and the opposite movable end disposed for being moved transversely of the direction of container conveyance in the transition region to opposite sides of the transition region to define alternate passageways for containers to be conveyed downstream of the transition region on said portion of the conveyor that extends beyond the transition region, infeed guide rails laterally spaced apart and parallel to each other for guiding the single file stream of containers as the containers are conveyed in the downstream direction to said transition region, a transitional guide rail junctioned in confluence with said infeed guide rails respectively, in the transition region, said transitional guide rails diverging from each other as they extend in the downstream direction over a predetermined distance form the transition region so that when said opposite movable end of the diverter rail is in one position the diverter rail and one of the transitional guide rails cooperate to define one of said passageways and when the free said movable opposite end is in the opposite position said diverter rail and the other of the transitional guide rails cooperate to define another passageway, and an actuator mechanically connected to a region at said opposite end of the diverter rail and operative to move said diverter rail alternately from one side of the transition region to the other.

2. Apparatus according to claim 1 including a stationary container separator rail extending downstream from the fixed one end of the diverter rail for keeping containers conveyed into said alternate passageways separated.

3. Apparatus according to claim 1 wherein a continuation of said transitional guide rails beyond said predetermined distance having the rails become parallel to each other to define separate discharge passageways in conjunction with said separator rail.

4. Apparatus according to claim 1 wherein the transitional guide rails have an S-shape configuration over the lengths of said rails wherein the rails diverge.

5. Apparatus according to claim 1 wherein there is a recess in a rail in the transition region for the free end of the diverter rail to nest and become flush with the rail to provide for a smooth transition from said rail to the diverter rail.

6. Apparatus according to claim 1 wherein said transitional guide rails are flexible and means supporting said transitional guide rails including means for adjusting said rails to increase or decrease the space between them.

7. Apparatus according to claim 1 wherein the diverter rail is flexible over its entire length.

8. Apparatus according to claim 1 wherein said actuator comprises a work cylinder having a piston rod, a guide rod extending transversely of the direction in which the containers are conveyed through the transition region, a slider member fastened to the piston rod and adapted to slide on said guide rod, said slider member is mechanically connected to said opposite movable end of the diverter rail for moving said opposite movable end to said opposite positions.

9. Apparatus according to claim 1 wherein said actuator comprises a work cylinder having a piston rod, a guide rod extending transversely of the direction in which the containers are conveyed through the transition region, a slider member fastened to the piston rod and adapted to slide on said guide rod, said slider member attached to said opposite movable end o the diverter rail for moving said opposite movable end to said opposite positions.

10. Apparatus according to claim 1 including a plurality of assembly means for assembling containers in alternate single file groups and means for transporting the alternate groups, respectively, to individual transition regions, each transition region having an elongated container diverter rail and at least two container groups and adjacent alternate outfeed tracks for receiving alternate groups, means for swinging the diverter rails to alternate angular positions for diverting the groups in succession to alternate tracks.

11. Apparatus according to claim 10 wherein the diverter rails operate in parallelism with each other.

12. Apparatus according to claim 1 wherein the conveyor on which the containers are conveyed before and after they pass through said transition region has opposite downstream extending edges, said diverter rail operating to position the containers on said conveyor with about 50% of the container overhanging the edges of the conveyor and rails extending along the edges of the conveyor in the downstream direction, said rails positioned above the conveyor a sufficient distance for the rails to prevent full size bottles from tipping off said conveyor but to allow broken bottles or fragments thereof that are not tall enough to obtain guidance from the rails to tip off the conveyor.

13. Apparatus according to claim 1 wherein said opposite movable end of said diverter rail in both of its positions at the sides of the transition region is flush with an infeed rail.

14. Apparatus for dividing a single file stream of containers into a plurality of separate streams, comprising:

a conveyor belt for conveying containers of the single file stream in a longitudinal downstream direction to a transition region, the belt having laterally spaced apart edges and passing through the transition region, infeed guide rails extending along the belt to the transition region, transitional rails arranged to adjoin in confluence with said guide rails, respectively, in said transition region and extending downstream thereof, said transitional rails diverging laterally away from each other in the downstream direction for a predetermined distance and said conveyor belt running intermediate of said transitional rails, a diverter rail having opposite ends and having at least one flexible section, support means for supporting stationarily one end of said diverter rail downstream of said transition region to provide for the opposite free end of the diverter rail to extend into said transition region, a controllable driver device and a member that is translatable by said driver device engaged with said free end of the diverter rail for driving said free end of the diverter rail alternatively into substantial confluence with one of the guide rails to provide a passageway for containers defined by said diverter rail on one side and a transitional rail on the other side for directing alternate containers onto margin areas of said belt on opposite sides of the center of the belt.

15. Apparatus according to claim 14 including a separator rail supported stationarily above said belt, the separator rail extending from said support means for the one end of the diverter rail downstream over the longitudinal center of the belt to provide a continuation of said passageways as defined by said transitional rails and said separator rail.

16. The apparatus according to any one of claims 14 or 15 wherein the width of said passageways defined by the distance between said separator rail and either of said transitional rails is such that about 50% of a diverted container overhangs the edge of the belt, the height of the transitional rails above said belt being such that unfractured bottles are retained on said belt by the transitional rails and shortened bottles due to being fractured and glass fragments on the belt are not retained by said rails and can slip off the belt.

17. Apparatus according to any one of claims 14 or 15 wherein said transitional rails are flexible and including, support means for said transitional rails and means on the support means for adjusting said transitional rails to attain various distances between each other to accommodate containers of various sizes, and support means for said infeed guide rails and means on the support means for adjusting said infeed guide rails to attain various distances between each other to accommodate containers of various sizes.

18. Apparatus according to any one of claims 14 and 15 wherein said diverter rail is flexible over its entire length.

19. Apparatus according to claim 16 wherein said diverter rail is flexible over its entire length.

20. Apparatus according to claim 17 wherein said diverter rail is flexible over its entire length.

21. Apparatus according to claim 14 wherein there are recesses in the infeed guide rails in said transition region for said free ends of the diverter rail to register in the respective recesses flush with an infeed rail.

* * * * *